US010371520B2

(12) United States Patent
Andersson et al.

(10) Patent No.: US 10,371,520 B2
(45) Date of Patent: Aug. 6, 2019

(54) QUADRATURE COMPENSATION METHOD FOR MEMS GYROSCOPES AND A GYROSCOPE SENSOR

(71) Applicant: RISE Acreo AB, Kista (SE)

(72) Inventors: Gert Andersson, Lindome (SE); Erik Svensson, Gothenburg (SE); Borys Stoew, Gothenburg (SE); Nils Hedenstierna, Vastra Frolunda (SE)

(73) Assignee: RISE ACREO AB, Kista (SE)

( * ) Notice: Subject to any disclaimer, the term of this patent is extended or adjusted under 35 U.S.C. 154(b) by 139 days.

(21) Appl. No.: 15/531,849

(22) PCT Filed: Dec. 17, 2015

(86) PCT No.: PCT/EP2015/080195
§ 371 (c)(1),
(2) Date: May 31, 2017

(87) PCT Pub. No.: WO2016/097127
PCT Pub. Date: Jun. 23, 2016

(65) Prior Publication Data
US 2017/0284803 A1    Oct. 5, 2017

(30) Foreign Application Priority Data
Dec. 18, 2014   (EP) ..................................... 14198946

(51) Int. Cl.
*G01C 19/5712*   (2012.01)
*G01C 19/574*   (2012.01)

(52) U.S. Cl.
CPC ....... *G01C 19/5712* (2013.01); *G01C 19/574* (2013.01)

(58) Field of Classification Search
CPC ............ G01C 19/5712; G01C 19/5719; G01C 19/574; G01C 19/5747; G01C 19/5776; G01C 19/5656; G01C 19/5769
See application file for complete search history.

(56) References Cited

U.S. PATENT DOCUMENTS 6,467,349 B1   10/2002   Andersson et al.
6,626,039 B1   9/2003   Adams et al.
(Continued)

FOREIGN PATENT DOCUMENTS

EP         2685211 A1      1/2014
WO    WO-2013/051060 A1    4/2013

OTHER PUBLICATIONS

International Search Report PCT/ISA/210 for International Application No. PCT/EP2015/080195 dated Mar. 2, 2016.
(Continued)

*Primary Examiner* — Helen C Kwok
(74) *Attorney, Agent, or Firm* — Harness, Dickey & Pierce, P.L.C.

(57) ABSTRACT

The present invention relates to a gyroscope sensor for detecting a rotational motion about a sensitivity axis and comprising means for quadrature compensation. The gyroscope sensor comprises a total inertial mass comprising a first inertial mass and a second inertial mass physically attached to each other and arranged such that a rotation of the first inertial mass about a detection axis caused by the coriolis force when the gyroscope sensor is subjected to a rotation about a sensitivity axis. The gyroscope further comprises a first drive structure having a displaceable drive frame which may cause a respective of the first or second inertial mass to rotate about the detection axis in order to
(Continued)

compensate for quadrature errors originating from faulty coupling between a drive mode and a sense mode of the gyroscope sensor.

15 Claims, 8 Drawing Sheets

(56) References Cited

U.S. PATENT DOCUMENTS

| | | | |
|---|---|---|---|
| 2005/0229703 A1* | 10/2005 | Geen | G01C 19/5719 |
| | | | 73/510 |
| 2011/0041609 A1 | 2/2011 | Clark et al. | |
| 2012/0013355 A1* | 1/2012 | Narita | G01C 19/574 |
| | | | 324/679 |
| 2014/0007681 A1 | 1/2014 | Lin | |
| 2014/0060186 A1 | 3/2014 | Clark et al. | |
| 2015/0330783 A1* | 11/2015 | Rocchi | G01C 19/5747 |
| | | | 73/504.12 |
| 2017/0268879 A1* | 9/2017 | Andersson | G01C 19/5712 |

OTHER PUBLICATIONS

Written Opinion of the International Searching Authority PCT/ISA/237 for International Application No. PCT/EP2015/080195 dated Mar. 2, 2016.

* cited by examiner

QUADRATURE COMPENSATION METHOD FOR MEMS GYROSCOPES AND A GYROSCOPE SENSOR

CROSS-REFERENCE TO RELATED APPLICATIONS

This application is the U.S. National Phase application of PCT Application No. PCT/EP2015/080195 filed on Dec. 17, 2015, which claims priority to European Application No. 14198946.7 filed on Dec. 18, 2014, the entire contents of each of which are incorporated herein by reference.

FIELD OF THE INVENTION

The present invention relates to a gyroscope sensor and to a method for quadrature compensation for a gyroscope sensor.

BACKGROUND

With the development of sophisticated methods for manufacturing micrometer structures in a controlled way, devices based on microelectromechanical system (MEMS) technology has become more attractive. One important type of device which has found a vast number of applications is the MEMS-based gyroscope. Such a device has great importance in e.g. navigation, positioning, and tracking of devices, but also for monitoring and controlling mechanical stability of apparatuses onto which a MEMS gyroscope may be mounted.

A great challenge in manufacturing a MEMS gyroscope is to achieve a reliable manufacturing method for fabricating sufficiently well-balanced gyroscope devices, preferably in a mass-production line. Such a gyroscope device typically comprises of interconnected inertial masses which may be excited to rotate or vibrate about an excitation axis during operation. Detection of a rotational motion is performed by detecting a deflection of the inertial mass about a detection axis influenced by the corolis force. However, manufacturing defects may introduce asymmetry in the gyroscope which may affect the operation in a negative way. For example, a coupling between an excitation motion of the gyroscope with the detection mode of the gyroscope distorts the detection mode and may cause a relatively high error in the output signal.

U.S. Pat. No. 6,467,349 discloses a MEMS gyroscope with relatively good performance for several applications, for example in the automotive industry. However, it would be desirable to reduce the impact of coupling between e.g. the excitation and detection modes of such a gyroscope in order to further improve the performance.

Thus, there is a need for an improved gyroscope sensor with improved compensation for faulty coupling to the detection mode of the gyroscope sensor.

SUMMARY OF THE INVENTION

In view of the above, it is a general object of the present invention to provide a gyroscope sensor with improved quadrature compensation.

According to a first aspect it is therefore provided a gyroscope sensor for detecting a rotational motion about a sensitivity axis, the gyroscope sensor comprising:
a total inertial mass comprising a first inertial mass and a second inertial mass physically attached to each other, each of the first and second inertial mass being arranged spaced apart from and facing a respective first and a respective second electrode, wherein a rotation of the first inertial mass (or total inertial mass) about a detection axis of the gyroscope sensor, the detection axis being perpendicular to the sensitivity axis and the rotation being caused by the coriolis force when the gyroscope sensor is subjected to a rotation about the sensitivity axis, results in a positive change of the capacitance between the total inertial mass and one of the first and the second electrode and a negative change of the capacitance between the total inertial mass and the other one of the first and the second electrode;
a first drive structure comprising:
a first and a second correction electrode arranged side by side and separated by a gap, and arranged on the same side of the first inertial mass as the first electrode and facing in the same direction; and
a first drive frame being displaceable relative to both said first and second correction electrodes and the first inertial mass and physically attached to the first inertial mass via a first coupling member, the drive frame comprising:
a first elongated correction member, the first elongated correction member arranged spatially and electrically separated from the first and the second correction electrode, arranged such that an overlap between the first elongated correction member with the gap and each of the first and the second correction electrode is variable,
wherein an electrostatic force between the first elongated correction member and the first and the second correction electrode is modifiable as a result of a changed degree of overlap between the first elongated correction member and the first and the second correction electrode, whereby the changed degree of overlap causes the drive frame to rotate about the detection axis.

In accordance with the invention an inertial mass of a gyroscope is the mass which is set in motion by an excitation, whereby the excitation causes the inertial mass to rotate or oscillate in a rotational manner. When the inertial mass is subjected to a rotation away from a horizontal orientation about the sensitivity axis which is perpendicular to the excitation axis (thus the axis about which the inertial masses are set in motion), the inertial mass rotates about a detection axis due to the coriolis force. The detection axis, the sensitive axis, and the excitation axis are perpendicular to each other. In more detail, it can be said that each of the first and second inertial mass has an associated first drive structure according to the above.

Each of the first and second inertial masses is associated with a respective corresponding first and second electrode. The first and second electrode of each mass are arranged such that the respective inertial mass faces the electrodes. The inertial masses are spaced apart from the electrodes as they may not be in physical contact with each other. The first and the second electrode are fixed (thus static) such that the capacitance between the first electrode and the inertial masses and the capacitance between the second electrode and the inertial masses is modified as a result of a motion of the inertial masses. Thereby, the first and second electrodes are arranged such that a rotation of the respective inertial mass about the detection axis results in a capacitance change of a first sign (e.g. negative) between one of the first electrode or the second electrode, and the first inertial mass; and a capacitance change of an opposite sign (e.g. positive if the first sign is negative) between the other one of the first or the second electrode and the first inertial mass.

Preferably, the two inertial masses are excited such that they oscillate in anti-phase with each other in a rotational motion about the excitation axis. Thus, when the first inertial mass oscillates in a counter-clockwise direction, the second inertial mass oscillates in a clockwise direction.

The drive structure comprises static parts and a displaceable part. The static parts comprise the first and second correction electrode. The displaceable is the displaceable drive frame. The static parts are thus static in the sense that they are fixed on a substrate such that the displaceable drive frame may move with respect to the first and second correction electrode and the further electrode set. Furthermore, since the drive frame is displaceable with respect to the static parts of the drive structure, and that the first elongated correction member is arranged spatially and electrically separated from the first and the second correction electrode, an overlap between the first elongated correction member with the gap and each of the first and the second correction electrode is variable. The spatial separation between the first elongated correction member and the first and the second correction electrode may be an air separation. (or another gaseous medium or vacuum). Further, the structure where the first and second correction electrodes of the first drive structure are static, i.e. fixed on the substrate and arranged on the same side of the each inertial mass as the first electrode, is to be understood as that the first and the second correction electrode are arranged on the same side of a plane spanned by the inertial mass(es) (when they are in a resting position) as the first electrode. Moreover, arranged to face the same direction is to be understood as to be placed with the front (front surface) in a certain direction, that certain direction being the same for the first correction electrode, second correction electrode and the first electrode. In the specific situation when flat surface electrodes are used, the front (or front surface) is to be understood as the surface of the electrode having a normal vector substantially parallel with the normal vector of the substrate surface that the electrode is arranged on.

The present invention is based on the realization that a drive structure separate from the inertial masses used for causing the excitation motion of the inertial mass may also participate in a sense mode of the gyroscope sensor. Thus, a rotation of the displaceable drive frame about the detection axis may also causes a motion of the first inertial mass. Consequently, a rotation of the drive frame about the detection axis may cause a rotation of the first inertial mass, connected to the drive frame, about the detection axis. The drive frame may also be used for causing the excitation motion of the first inertial mass. In other words, the drive frame may participate in both the sense and the drive mode of the gyroscope. In realization, an unwanted deflection in the drive mode affecting the sense mode (thus the rotation about the detection axis) may be compensated for by generating torque acting on the sense mode. Therefore, the unwanted deflection which may cause the inertial mass to rotate undesirably about the detection axis, may be compensated for by reversely rotating the inertial mass back to a desired orientation. The unwanted deflection causes a quadrature error of the output signal from the gyroscope. This error may be compensated for with the invention. The signal caused by the quadrature error is generally in phase with the excitation signal of the gyroscope. The output signal caused by the rotation about the detection axis due to the corolis force and due to the excitation is 90 degrees out of phase with the excitation.

Moreover, by having drive frames that are displaceable relative to the inertial masses, i.e. having them as separate mechanical units/structures but physically connected to each other by a coupling member, several advantageous features can be achieved. The drive structures on the drive frames are meant to generate large horizontal forces (horizontal in reference to the substrate plane or the plane comprising the sensitivity axis and the detection axis), which gives the drive mode of the gyroscope a large amplitude. However, they also tend to generate small vertical forces (vertical in reference to the substrate plane or along the excitation axis) which could disturb the sense mode if they were to be placed directly on the inertial masses. Instead the drive frame can be configured to be relatively stiff in the vertical direction which reduces this potential source of quadrature error.

Further, an advantage of having the quadrature compensation electrodes (the correction electrodes and the corresponding elongated correction member), on a drive frame that is a separate mechanical unit in reference to the inertial mass is that the electrostatic softening effect is reduced. The electrostatic softening effect has a negative impact on the sense mode by lowering the sense frequency.

According to an embodiment, the drive structure may further comprise a further electrode set and the drive frame may comprise a set of drive electrodes arranged adjacent to the further electrode set, wherein when a voltage is applied to the further electrode set the drive frame is set in motion, thereby moving the first elongated correction member with respect to the first and the second correction electrode, and also the first inertial mass, Each of the drive electrodes and each of the electrodes of the further electrode set may be comb-formed, wherein each drive electrode and the respective further electrode is interdigitated. This way the capacitive coupling between the drive electrodes and the further electrodes is improved. For example, for each tooth of a comb-formed electrode (either drive electrode or further electrode) two capacitors are formed, one on each side of the each tooth. Thereby, the possible force between the respective pair of electrodes is increased.

According to an embodiment of the invention, the first inertial mass may be physically connected to the drive frame such that a motion of the drive frame causes the first inertial mass to rotate about an excitation axis perpendicular to the detection axis. Thereby, control of the rotation about the excitation axis is improved. Furthermore, this improves control of the rotation of the first inertial mass about the detection axis with the drive structure since the excitation motion (thus rotation of the inertial mass about the excitation axis) is caused by the same structure which comprises the first elongated correction member that participates in the compensation rotation of the first inertial mass about the detection axis.

Advantageously, the drive frame is physically connected to the first inertial mass via the first coupling member at an end portion of the first inertial mass, wherein the end portion faces the drive frame, and wherein the first coupling member is physically connected to the displaceable drive frame at a far side from the first inertial mass with respect to the drive frame. In this way, the first coupling member is made relatively long. Thereby, in order to cause a sufficient excitation motion for the first inertial mass connected with the drive frame, a larger displacement of the drive structure is need compare to if the coupling member was shorter. Consequently, the displacement of the first elongated correction member is also larger. Thereby, the degree of overlap between the first correction member and the first and the second correction electrode is increased. This enables an increased variation in electrostatic force between the first elongated correction member and the first and the second correction electrode. Consequently, the rotation of the first inertial mass about the detection axis caused by the rotation of the drive frame may be improved and thereby also the quadrature compensation efficiency.

According to an embodiment of the invention, the first elongated correction member may be arranged with the elongation direction of the first elongated correction member being substantially parallel with the detection axis. This further improves the efficiency of quadrature compensation since the overlap between the first correction member and the first and the second correction electrode is further optimized. The motion of the drive frame in order to cause excitation of the inertial mass (thus rotation about the excitation axis) may be substantially perpendicular to the detection axis, this means that in order to enable a relatively large change in the overlap between first elongated correction member and the first and the second correction electrode and the gap, the first elongated correction member should be arranged with the elongation direction substantially parallel with the detection axis.

According to an embodiment of the invention, the first elongated correction member may be arranged at an end portion of the drive frame, opposite the end portion of the drive frame closest to the detection axis. Thus, the first elongated correction member is arranged relatively far from the detection axis. Thereby, the torque from the first elongated correction member on the first inertial mass caused by the electrostatic forces between first elongated correction member and the first and the second correction electrode is relatively large, thus improving quadrature compensation further.

In yet another embodiment of the invention, the drive structure may further comprise a drive sensing electrode and the drive frame may comprise a respective drive sensing member arranged adjacent to the drive sensing electrode, wherein a motion of the drive frame results in a change in capacitance between the drive sensing electrode and the drive sensing member, thereby sensing the motion of the drive frame. Since the entire drive frame is excited, a sensing of the drive motion may in principle be done on the same electrodes as for driving the excitation. It is advantageous however, to physically separate the sensing electrodes and the drive electrodes in this way the measurement electronics may be simplified.

In a further embodiment of the invention, the drive frame may comprise at least two elongated correction members and the drive structure may comprise at least a respective second correction electrode pair. Thereby the total torque from the two elongated correction members instead of a single elongated correction member is increased, thus improving quadrature compensation further.

In embodiments of the invention, the drive frame may be suspended by a plurality of springs. Thereby, the movement of the drive frame may be improved.

According to embodiments of the invention, the sensor may be a planar sensor. In other words, parts of the sensor, e.g. at least a part of the inertial masses and the drive frame may be arranged in the same center plane when the sensor is at rest. The inertial masses and the drive frame may be arranged in a layer of the sensor.

According to embodiments of the invention, each of the first and the second inertial mass of the gyroscope sensor may be associated with a respective first and second drive structure. The drive structures of the two inertial masses may advantageously be operated synchronously and in phase such that the two inertial masses are excited such that they oscillate in anti-phase with each other in a rotational motion about the excitation axis. Each of the inertial masses has an associated first and second drive structure such that the quadrature error may be efficiently compensated for with regards to both inertial masses, and thereby for the entire gyroscope sensor.

Moreover each drive structure may advantageously be arranged external to a side of the first and second inertial mass. The drive structures are external in such a way that they are arranged as a separate mechanical unit in reference to the inertial masses. Each of the drive structures having a drive frame connected to the respective mass with a coupling member which is preferably self-supporting. Further, the term arranged to the side is to be understood as each drive structure, more specifically, each drive frame being laterally separated from the respective inertial mass.

According to a second aspect of the present invention there is provided a method for quadrature compensation for a gyroscope sensor, the gyroscope sensor comprising:

a total inertial mass comprising a first inertial mass and a second inertial mass physically attached to each other a first inertial mass and a second inertial mass physically attached to each other, each of the first and second inertial mass being arranged spaced apart from and facing a respective first and a respective second electrode, wherein a rotation of the first inertial mass about a detection axis of the gyroscope sensor, the detection axis being perpendicular to the sensitivity axis and the rotation being caused by the coriolis force when the gyroscope sensor is subjected to a rotation about the sensitivity axis, results in a positive change of the capacitance between the total inertial mass and one of the first and the second electrode and a negative change of the capacitance between the total inertial mass and the other one of the first and the second electrode;

a first drive structure comprising:
a first and a second correction electrode arranged side by side and separated by a gap, and arranged on the same side of the first inertial mass as the first electrode and facing in the same direction; and
a first drive frame being displaceable relative to the first inertial mass and physically attached to the first inertial mass via a first coupling member, the drive frame comprising:
a first elongated correction member, the first elongated correction member arranged spatially and electrically separated from the first and the second correction electrode, arranged such that an overlap between the first elongated correction member with the gap and each of the first and the second correction electrode is variable, wherein the method comprises the steps of:

causing the drive frame to move in a lateral direction, thereby causing the first inertial mass to oscillate in a rotational motion about an excitation axis perpendicular to the detection axis and to the sensitivity axis and also;

detecting a quadrature offset by detecting a change of the capacitance between the total inertial mass and one of the first and the second electrode corresponding to a motion of the first inertial mass about the detection axis, the variation in capacitance being in phase with the rotational motion of first inertial mass about the excitation axis;

applying a voltage across the first and the second correction electrode, thereby subjecting the first elongated correction member to an electrostatic force, thereby rotating the drive structure about the detection axis and thereby also rotating the first inertial mass about the detection axis.

The quadrature signal which is desired to minimize is in-phase with the excitation, thus in phase with the rotational motion of the first inertial mass about the excitation axis. Therefore, by detecting the change in capacitance between the inertial mass and one of the first and the second electrode, in-phase with the change excitation, the quadrature error contribution may be measured and thus compensated for by applying appropriate voltages to the first and second correction electrodes, thereby rotating the drive structure.

The lateral direction is preferably in a plane substantially parallel to a plane of the detection axis and the sensitivity axis.

In an embodiment of the invention, each of the first and the second inertial mass of the gyroscope sensor may be associated with respective first and second drive structure, wherein the method steps are performed on each of the drive structures.

According to yet another embodiment of the invention, the method may further comprise applying a first voltage across the first and second correction electrode of the first or second drive structure of the first inertial mass thereby rotating the first or second drive frame of the first inertial mass about the detection axis and thereby also rotating the first inertial mass about the sensitivity axis in a first rotational direction about the detection axis, applying a second voltage across the first and second correction electrode of the first or second drive structure of the second inertial mass thereby rotating the first or second drive frame of the second inertial mass about the detection axis and thereby also rotating the second inertial mass about the sensitivity axis in a second rotational direction about the detection axis, wherein the first rotational direction is opposite to the second rotational direction.

Further effects and features of this second aspect of the present invention are largely analogous to those described above in connection with the first aspect of the invention.

Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF DRAWINGS

These and other aspects of the present invention will now be described in more detail, with reference to the appended drawings showing a currently preferred embodiment of the invention, wherein.

DETAILED DESCRIPTION OF EMBODIMENTS OF THE INVENTION

Figure 1A:
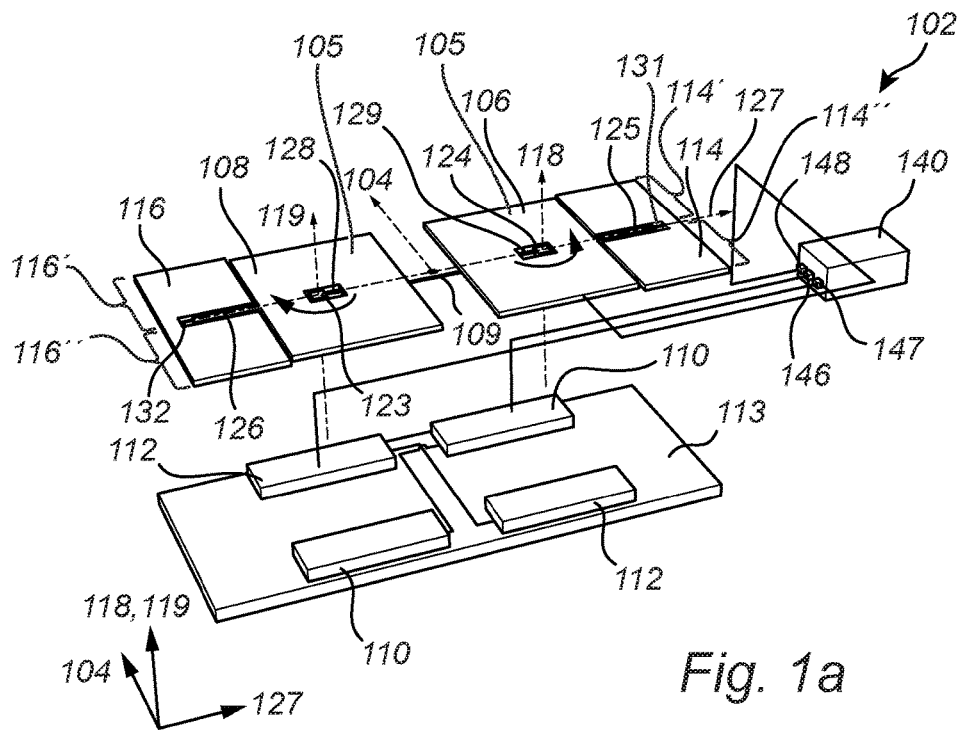
FIG. 1a-b illustrate an exploded view (FIG. 1a) of a gyroscope sensor and a perspective view (FIG. 1b) of the same gyroscope sensor.
Figure 1B:
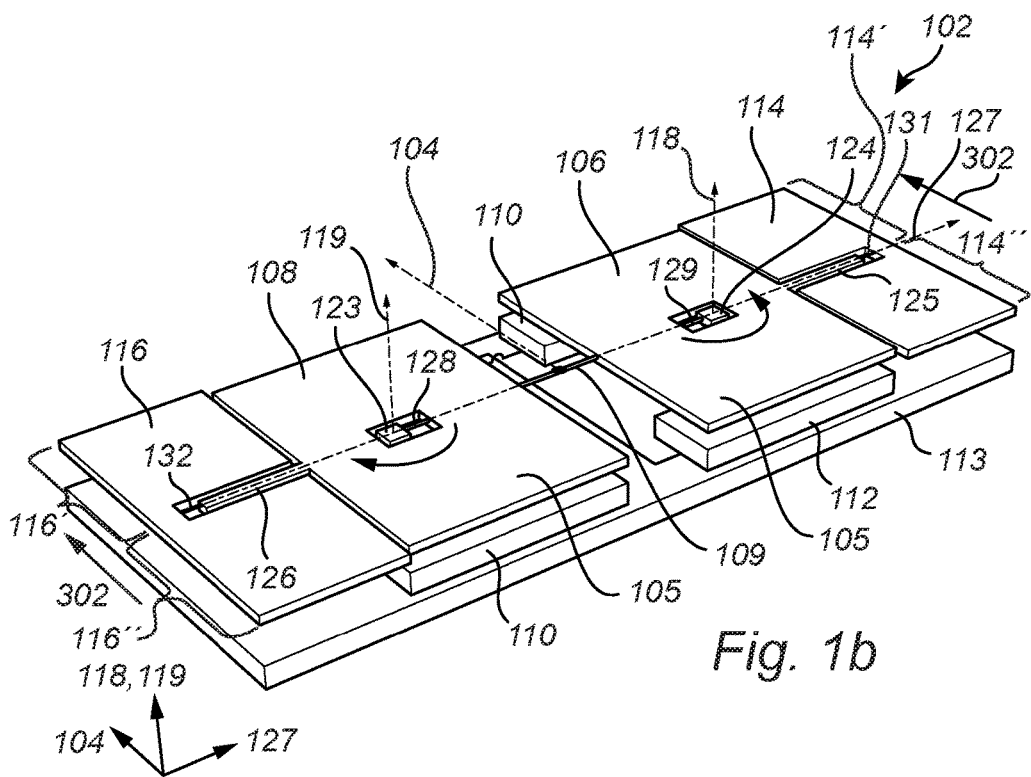

FIG. 1a illustrates an exploded view of a gyroscope sensor 102 and FIG. 1b illustrates a perspective view of the gyroscope sensor 102 shown in FIG. 1a, with the purpose of describing the basic principle of operation and the structural features of the gyroscope sensor 102. There is further an electronic device 140 electrically connected to the gyroscope sensor 102.

The gyroscope sensor 102 comprises a first 106 and a second 108 inertial mass, a first 110 and a second electrode 112, and total drive frames 114, 116, each total drive frame comprising a first 114', 116' and a second 114", 116" drive frame. There is also indicated in FIG. 1a-b, a sensitivity axis 104, excitation axes 118, 119, and a detection axis 127 for the gyroscope sensor 102. The coordinate axes illustrates the orientation of the different axes 104, 118, 119, 127. The first 106 and the second 108 inertial mass are physically attached to each other via the connecting member 109. The connecting member 109 may be in the form of a transverse beam, rod, or spring (the list is non-exhaustive) interconnecting the first 106 and the second 108 inertial mass. Each inertial mass 106, 108 is arranged spatially spaced apart from and facing a first electrode 110 as well as a second electrode 112. The electrodes 110, 112 are arranged on a supporting substrate 113, and the electrodes 110, 112 are also arranged separated from the inertial masses 106, 108. For example, in a resting position of the inertial masses 106, 108, the electrodes 110, 112 are arranged in a plane parallel to the plane of the inertial masses 106, 108. Moreover, the relatively large surface area of the electrodes 110, 112 that is facing away from the supporting substrate 113 is to be understood as a front (or front surface) of the electrodes 110, 112.

The inertial masses 106, 108 are suspended at the anchor points 123, 124 respectively via for example springs 128, 129 such that the first and second inertial mass 106, 108 may oscillate in a rotational motion about a respective excitation axis 118, 119. The first and the second inertial mass 106, 108 are further connected to a respective total drive frame 114, 116. The total drive frames 114, 116 being spatially separated from the respective inertial mass 106, 108, thus making the drive frames 114, 116 displaceable relative to the inertial masses 106, 108. For example, the first inertial mass 106 is physically connected to total drive frame 114 via a coupling member 125 and the second inertial mass 108 is physically connected to total drive frame 116 via a coupling member 126 (e.g. a connecting rod, beam or spring, this list is non-exhaustive). Furthermore, the coupling members 125, 126 may for example be a beam with a spring type connection 131, 132 to the respective total drive frame 114, 116. Or, the coupling members 125, 126 may for example be a rod with a spring type connection 131, 132 to the respective total drive frame 114, 116. With a spring-type connection is meant an elastic connection.

As the total drive frames 114, 116 are actuated to move in a lateral direction, indicated by arrows 302, for example in a direction substantially parallel with the sensitivity axis 104, the total drive frames 114, 116 together with the coupling members 125, 126 cause the respective inertial mass 106, 108 to rotate about the respective excitation axis 118, 119.

If the gyroscope sensor 102 is subjected to a rotation about the sensitivity axis 104, the inertial masses 106, 108 if they are excited to oscillate about the excitation axis 119, 118, will also oscillate in a rotational manner about the detection axis 127 due to the corolis force and due to the excitation. The rotational oscillation about the detection axis is also called the sense mode and is illustrated in FIG. 3.

In the sense mode (illustrated in FIG. 3) the first 106 and the second inertial mass 108 oscillate about the detection axis 127. FIG. 3 illustrates one position of the oscillation. This oscillation causes the distance between the respective inertial mass 106, 108 and each electrode 110, 112 to vary periodically with the oscillation. Thereby, also the capacitances between the inertial mass 106, 108 and the electrodes 110, 112 vary periodically. The excitation of the inertial masses (see FIG. 2) is performed at an excitation frequency. Thus the first 106 and the second inertial mass 108 oscillate about the respective excitation 118, 119 axis with the excitation frequency. Thereby, the oscillation rotational motion of the inertial masses 106, 108 about the detection axis 127 as shown in FIG. 3 will be synchronous with the oscillation of the inertial masses 106, 108 about the excitation axis 118, 119. Thus, the capacitance change between the inertial mass 106, 108 and the electrodes 110, 112 will therefore also be synchronous with the excitation frequency.

Furthermore, FIG. 1 schematically shows one example of an electronic device 140 connected to the gyroscope sensor 102 for detecting a capacitance change indicative of the rotation about the sensitivity axis 104. As previously described, spaced apart from the first 106 and second inertial mass 108, a set of electrodes 110, 112 is provided for the gyroscope sensor 102. The electronic device 140 comprises input terminals 146-148. The first input terminal 146 is electrically connected to the first electrode 110 and the second input terminal 147 is electrically connected to the second electrode 112. The third input terminal 148 is electrically connected to the first 106 and the second inertial mass 108 (the first 106 and the second 108 inertial mass are electrically connected to each other via connecting member 109). According to one example embodiment, the inertial masses 106, 108 and the connecting member 109 are made in one piece. The electronic device 140 is configured to detect a capacitance between the total inertial mass 105 (the total inertial mass 105 constituting the first 106 and the second 108 inertial mass) and the first electrode 110, and to detect a capacitance between the total inertial mass and the second electrode 112, or a least to detect a voltage indicative of the respective capacitance or a change in capacitance. Furthermore, the output signal may be the differential capacitance difference between the capacitance between the first electrode 110 and the inertial mass 105 and the capacitance between the second electrode 112 and the inertial mass 105.

Figure 2:
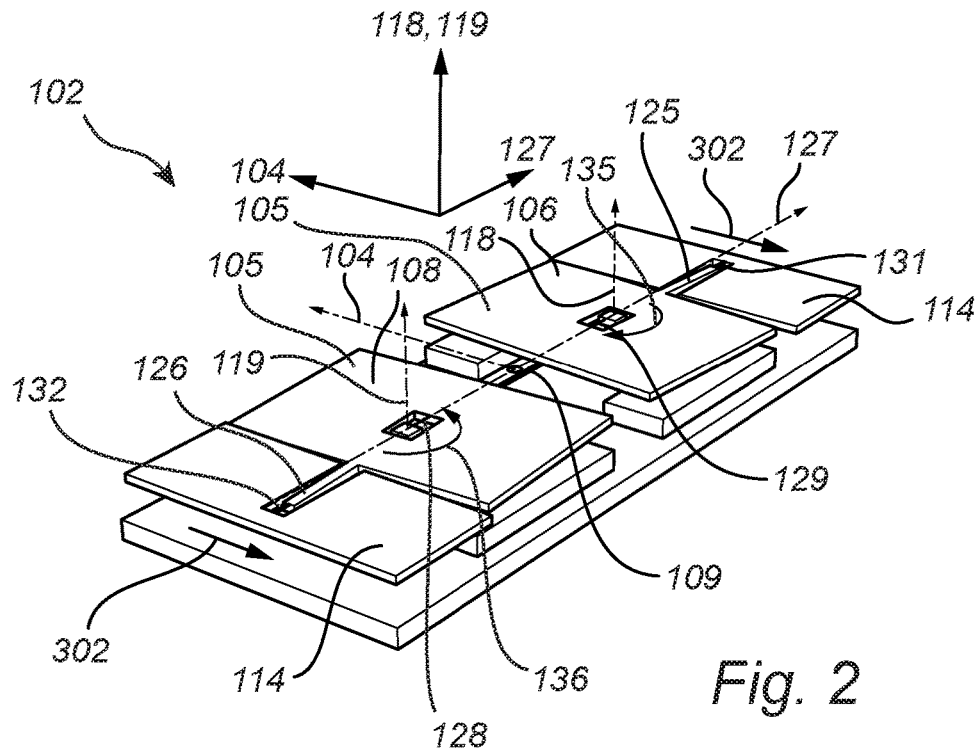
FIG. 2 shows an exemplary embodiment of the invention in a drive mode.
Figure 3:
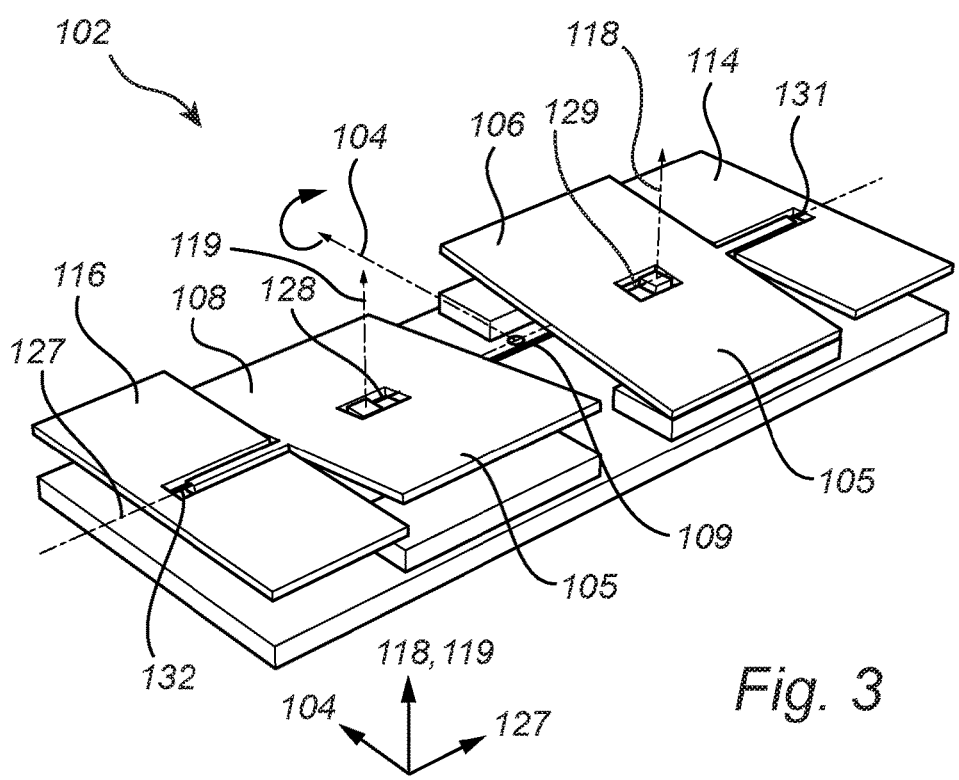
FIG. 3 shows an exemplary embodiment of the invention in a sense mode.

FIG. 2 illustrates the motion of the inertial masses 106, 108 of the sensor 100 in the drive mode and FIG. 3 illustrates the sense mode of the sensor 100.

In the drive mode, shown in FIG. 2, each of the total drive frames 114, 116 of the gyroscope sensor 102 are exciting the respective inertial mass 106, 108 about the respective excitation axis 118, 119 by a motion of the total drive frame 114, 116 in a lateral direction indicated by the arrows 302. Subsequently the drive frames 114, 116 are moved in a direction opposite the arrows 302. Each inertial mass 106, 108 is physically connected to a respective total drive frame 114, 116 with a coupling member 125, 126 such that the motion of the excitation means causes the respective inertial mass 106, 108 to oscillate in a rotational motion about the excitation axis 118, 119.

The total drive frames 114, 116 are arranged to excite the inertial masses 106, 108 of so that the inertial masses rotate synchronously in anti-phase (i.e. in opposite directions) with respect to each other about the respective excitation axis 118, 119 as illustrated in FIG. 2.

When the gyroscope sensor is in the drive mode, thus when the inertial masses are being excited as described with reference to FIG. 2, and if the gyroscope sensor 100 is then subjected to a rotation about the sensitivity axis 104, then the coriolis force cause a rotational motion of the inertial masses 106, 108 about the detection axis 127 of the respective inertial mass 106, 108 in a way as shown in FIG. 3. Furthermore, as described with reference to FIG. 2, the excitation of the inertial masses 106, 108 about the respective excitation axis 118,119 is such that the inertial masses 106, 108 oscillate synchronously in anti-phase. In other words, when the inertial mass 106 rotate in a first (e.g. clockwise) direction 135, the second inertial mass 108 rotate in an opposite direction 136, here in the counter-clockwise direction. This anti-phase oscillation leads to the similar anti-phase motion in the sense mode as described with reference to FIG. 3. Thus, as the inertial mass 106 rotate in a clockwise direction, the inertial mass 108 rotate in a counter-clockwise direction about the detection axis 127.

A quadrature offset (i.e. deviation) may appear if the drive mode (i.e. the excitation) shown in FIG. 2 couples to the sense mode shown in FIG. 3. That means, even if there is no input, thus in the absence of a rotation about the sensitivity axis of the gyroscope sensor 102, the inertial masses 106, 108 rotate about the detection axis 127. The coupling may be due to manufacturing defects which may cause asymmetry in the gyroscope sensor 102. For example, possible sources of asymmetry is in the inertial masses (106, 108), the coupling members 125, 126, the spring type connections 131, 132, the connecting member 109, or springs 128, 129. In particular, asymmetries in a spring (e.g. springs 131, 132, 128, 129) and in the attachment of springs to the anchor points 123, 124 may give a relatively large quadrature offset (e.g. in the order of 10 000°/s). With the invention, the quadrature offset may be compensated for, or at least partly compensated for. This will now be described in more detail.

Figure 4A:
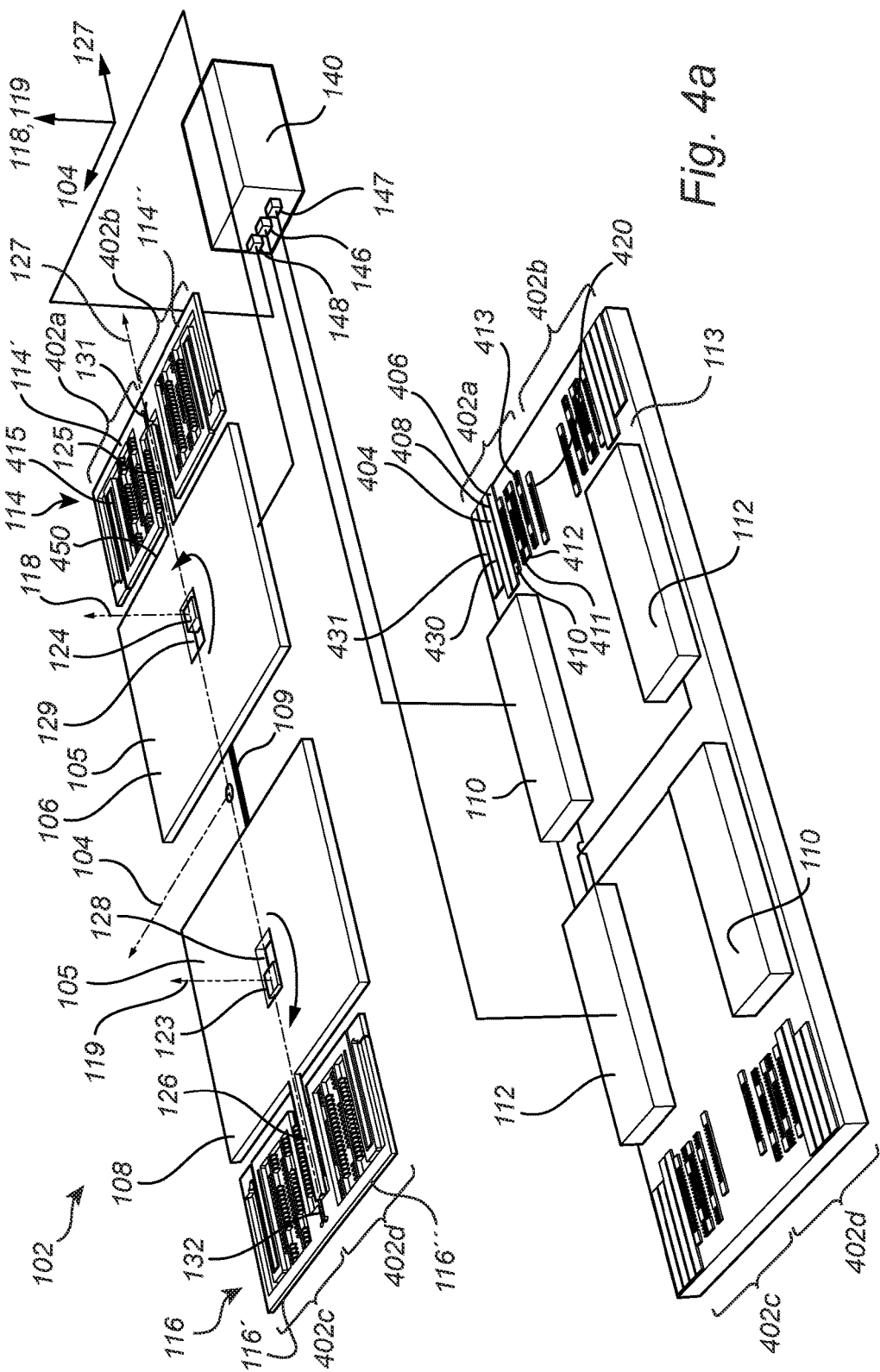
FIG. 4a-c illustrate an exploded view (FIG. 4a) of a gyroscope sensor and close-up view (FIG. 4b) of a drive structure and of the drive frame (FIG. 4c) of the same gyroscope sensor.
Figure 4B:
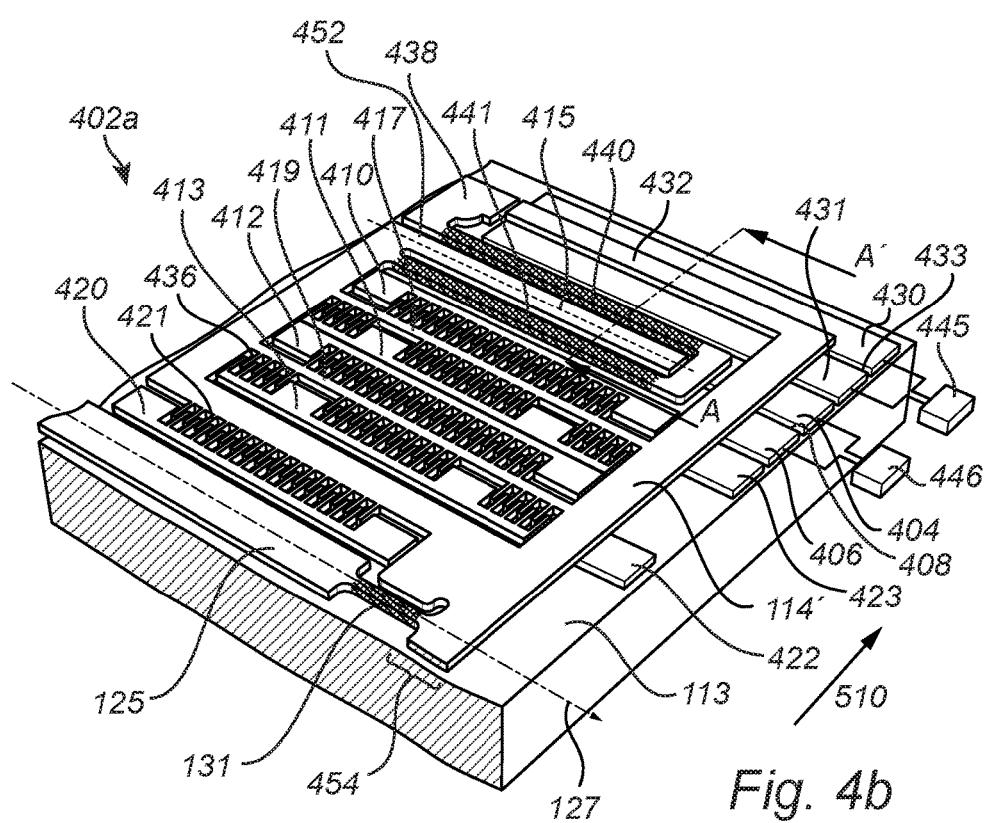
Figure 4C:
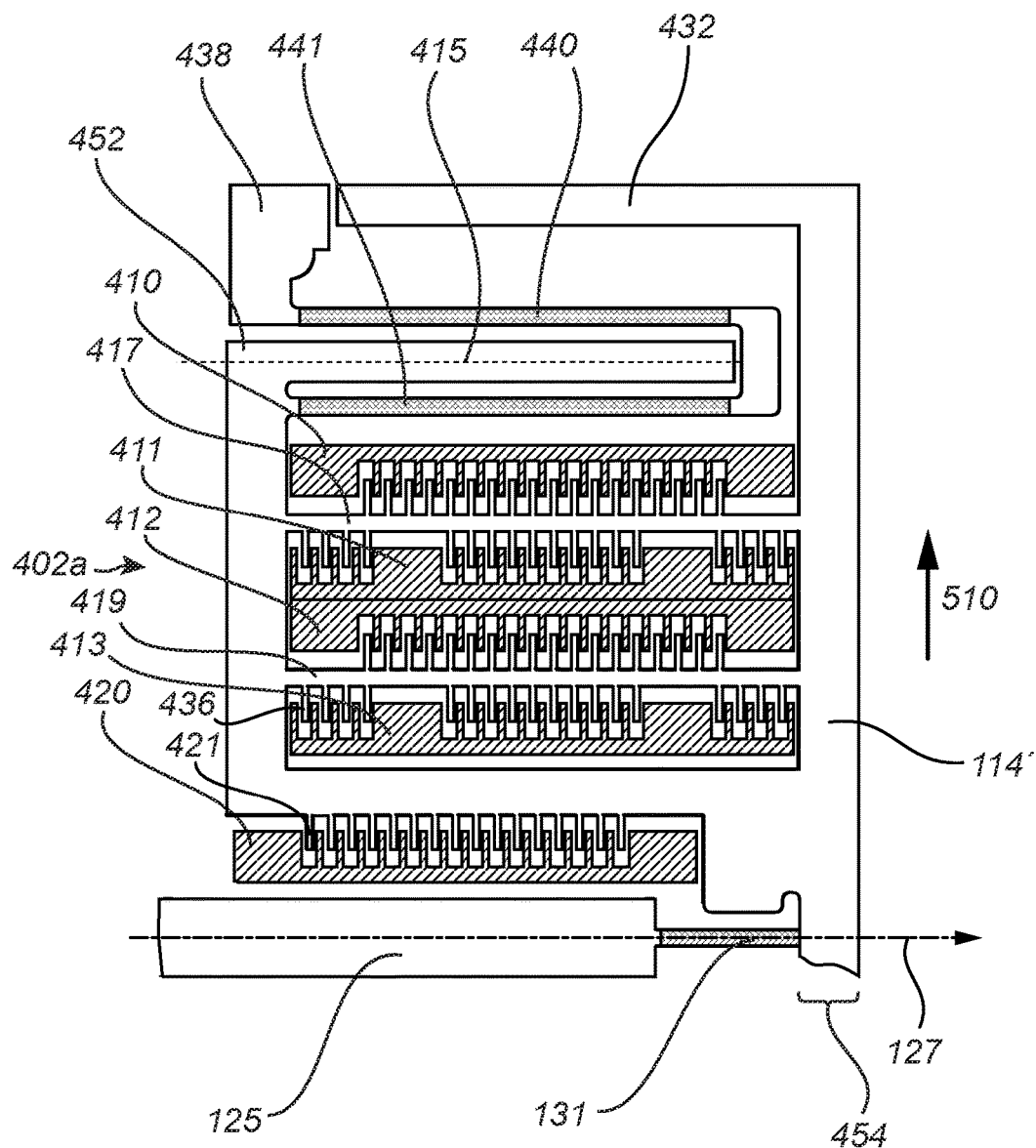

FIG. 4a illustrates a gyroscope sensor 102 with external drive structures 402a-d, of which one 402a is shown in the close up view FIG. 4b and the drive frame 114' is shown in FIG. 4c. This gyroscope sensor 102, in general has the same arrangement as described in relation to FIGS. 1-3. Furthermore, although only one of the drive structures and drive frames are shown close-up, the other drive structures and drive frames have analogue structural features as the drive structure 402a with drive frame 114'. Therefore, the following description of drive structure 402a and drive frame 114' also applies to drive structures 402b-d with respective drive frames 114", 116', 116". Reference numerals have only been included for one of the drive structures in order for ease of reading the drawing.

Each drive structure 402a-d comprises a first 404 and a second 406 correction electrode arranged side by side on the substrate 113 and separated by a gap 408. The correction electrodes 404, 406 are arranged on the same side of the first inertial mass 106 as the first electrode 110 and facing in the same direction. As mentioned, facing in the same direction is to be interpreted as arranged/placed with the front (or front surface) in the same direction. And where the front or front surface is to be interpreted as the relatively large surface area of the electrodes 110, 112 and the correction electrodes 404, 406 that is facing away from the supporting substrate 113 (i.e. the opposite surface in reference to the surface of the electrode plates that is engaging the supporting substrate). There is also shown a further electrode set 410, 411, 412, 413 arranged on the substrate 113. Furthermore, there is shown displaceable total drive frames 114, 116 which is physically attached to the respective inertial mass 106, 108 via a coupling member 125, 126 comprising a spring connection 131, 132. The total drive frame 114 comprises a first drive frame 114' and second drive frame 114" which are interconnected. The total drive frame 116 comprises a first drive frame 116' and second drive frame 116" which are interconnected. Each drive frame 114', 114", 116', 116" comprises a first elongated correction member 415 and a set of drive electrodes 417, 419. The drive frames 114', 114", 116', 116" are further connected via spring connections in the form of springs 440, 441 to an anchor point 438 (only shown in FIG. 4b and FIG. 4c). Thereby, the drive frame is suspended over the substrate 113. The first elongated correction member 415 is arranged spatially and electrically separated from the first 404 and the second 406 correction electrode. Furthermore, the first elongated correction member 415 is arranged such that an overlap between the first elongated correction member 415 with the gap 408 and each of the first 404 and the second 406 correction electrode is variable as is more clearly seen in FIG. 5 in combination with FIG. 4b.

As is shown in more detail in FIG. 4b and FIG. 4c, the set of drive electrodes 417, 419 of the drive frame 114' are arranged adjacent to the further electrode set 410-413. When a voltage is applied to the further electrode set 410-413, for example via connection points 422, 423 illustrated in FIG. 4b, the drive frame 114' (thereby also the total drive frame 114) is set in motion. The motion is due to an attraction force between the set of electrodes 417, 419 and the further electrode set 410-413 caused by the applied voltage having a varying polarity. The further electrode set 410-413 has interconnections (not shown) such that adjacent electrodes of the set have opposite polarities shifted 180 degrees in phase. For example, electrodes 410 and 412 may a first polarity (i.e. one of positive and negative) when the electrodes 411 and 413 have a second polarity opposite the first polarity (i.e. the other one of positive and negative). In this case, the set of electrodes 417, 419 and the further electrode set 410-413 are shown as comb-formed electrodes comprising "fingers" or combs 436 (only one is numbered). Thus, the set of electrodes 417, 419 and the further electrode set 410-413 are inter-digitated which effectively increases the capacitance between the set of electrodes 417, 419 and the further electrode set 410-413 thereby increasing the force between set of electrodes 417, 419 and the further electrode set 410-413. This is just an example, other configurations are possible. During operation of the gyroscope sensor 102, the drive frame 114' (and the other drive frames 116', 116', 114") are each subjected to a DC voltage or e.g. 1-10 V. Thus, when a voltage signal (e.g. a sine signal causing an opposite polarity) is applied across the further electrode set 410-413, a variable electrostatic force is generated between the electrodes of the further electrode set 410-413 and the set of electrodes 417, 419 due to a voltage difference between the drive frame 114' (thereby, the set of electrodes 417, 419) and the further electrode set 410-413. Since the voltage difference has a sinusoidal variation (in this case, other variations are possible), the electrostatic force will have a sinusoidal variation. This electrostatic force causes a motion of the displaceable drive frame 114' in the direction 510.

Furthermore, in addition to the DC voltage applied to the drive frame 114', there may be a relatively high frequency signal (e.g. 250 kHz-50 MHz) with amplitude of a few volts (e.g. 1 V) applied to the drive frame 114'. This signal may be used for sensing the drive motion using the drive sensing electrode 420 and the respective drive sensing member 421.

The DC voltage and the high frequency signal may be applied to the drive frame 114' (and the other drive frames 116', 116', 114") or the total inertial mass 105 using the electronic device 140.

Figures 5, 6:
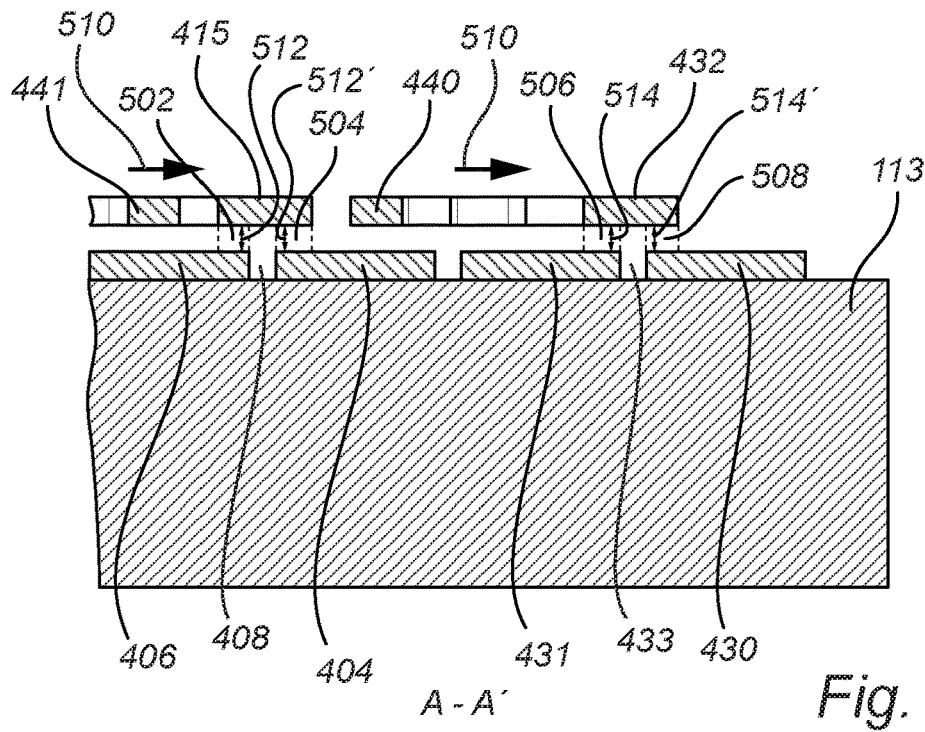
FIG. 5 illustrates a cross-section of a part of the drive structure shown in FIG. 4a-b.
FIG. 6 is a flow-chart of method steps according to an embodiment of the invention.

When the drive frame 114' is set in motion (e.g. for excitation of the first inertial mass 106) the first elongated correction member 415 moves with respect to the first 404 and the second 406 correction electrode. The first inertial mass 106 also moves as a result of the motion of the drive frame 114' (as does inertial mass 108 as a result of the motion of the drive frames 116', 116"). The motion of the inertial masses 106, 108 is the excitation motion (i.e. the drive mode) described with reference to FIG. 2. Thus, the drive frame 114' is set in motion in the lateral direction indicated by arrow 510 in order to cause the excitation of the inertial mass 106. Note that excitation of the masses of the gyroscope sensor was also described with reference to FIG. 2, with the total drive frame 114 moving in the direction of the arrow 302 being the same motion as the motion indicated by arrow 510. A voltage is applied by voltage generating device 445 across the first 404 and the second 406 correction electrode in order to establish an electrostatic force between the first elongated correction member 415 and the first 404 and the second 406 correction electrode. As previously described, a DC voltage is applied to the drive frame 114'. Thus there is a voltage potential difference between the drive frame 114' and at least one of the first 404 and the second 406 correction electrode which enables establishing the electrostatic force. The voltage applied to the first 404 and the second 406 correction electrode may for example be in the range of 1-5 V. As is illustrated also in FIG. 5 showing the cross-section A-A' indicated in FIG. 4b and FIG. 5, the motion (indicated by arrows 510, note that the motion subsequently is in the other direction) of the first elongated correction member 415 with respect to the first 404 and the second 406 correction electrode causes a changed degree of overlap 502, 504 between the first elongated correction member 415 and the first 404 and the second 406 correction electrode. The electrostatic force between the first elongated correction member 415 and the first 404 and the second 406 correction electrode depends on the overlap 502, 504. This means that the electrostatic force between the first elongated correction member 415 and the first 404 and the second 406 correction electrode is varied as the drive frame moves in the direction 510 and the overlap 502, 504 varies. Thus, the first elongated correction member 415 is attracted in a changing manner from the first 404 and the second 406 correction electrode, thereby changing the distance 512' and 512 between the first elongated correction member 415 and the first 404 and the second 406 correction electrode. As the distance 512', 512 is varied by the electrostatic force, the drive frame 114' is rotated about the detection axis 127. Furthermore, since the drive frame 114' is physically attached to the first inertial mass 106, the first inertial mass 106 is also rotated about the detection axis 127 as a result of the rotation of the drive frame 114'. Naturally, the drive frame 116' is physically attached to the second inertial mass 108 thereby the second inertial mass 108 is also rotated about the detection axis 127 as a result of the rotation of the drive frame 116'. Subsequently, when the motion of the drive frame 114' for excitation (as shown in FIG. 2) is in the other direction (thus opposite the pointing direction of the arrows 510) the overlap 502 and 504 is again changed and the electrostatic force between the first elongated correction member 415 and the first 404 and the second 406 correction electrode is modified differently (e.g. opposite), thereby causing a rotation of the drive frame 114' (or 116') about the detection axis 127 in a direction opposite from when the motion of the drive frame 114' (or 116') was in the other direction.

Note that since the distance 512', 512, 514', 514 changes with the varying degree of overlap 502, 504, 506, 508 the overall motion of the drive frame will be a combination of the lateral motion 302, 510 for excitation and the rotating motion about the detection axis 127 due to the changing distances 512', 512, 514', 514 caused by the varying degree of overlap 502, 504, 506, 508 and the thereby varying electrostatic force. The same applies with respect to the drive frame 116', 116" with the corresponding inertial mass 108.

During operation of the gyroscope sensor, the voltage across the first 404 and the second 406 correction electrode may be constant. Thus, a calibration is made before operation to establish the constant voltage in order to minimize the quadrature error.

Furthermore, each drive frame 114', 114', 116', 116" further comprises a second elongated correction member 432 with corresponding second correction electrodes 430, 431 also separated by a gap 433. The function of this second elongated correction member 432 with correction electrodes 430, 431 is analogue with the function of the first elongated correction member 415. The second elongated correction member 432 and the corresponding correction electrodes 430, 431 are also shown in FIG. 5. In order to achieve the electrostatic force between the second elongated correction member 432 and the correction electrodes 430, 431, a voltage is applied by voltage generating device 446 across the first 430 and the second 431 correction electrode. As is shown in FIG. 5 the motion (indicated by arrows 510, note that the motion subsequently is in the other direction) of the second elongated correction member 432 with respect to the first 430 and the second 431 correction electrode causes a changed degree of overlap 506, 508 between the second elongated correction member 432 and the first 431 and the second 430 correction electrode of the second elongated correction member 432. The changed degree of overlap 506, 508 causes the electrostatic force to vary and thereby changing the distance 512' and 512 between the first elongated correction member 415 and the first 404 and the second 406 correction electrode by attraction. As the distance 512', 512 is varied by the electrostatic force, the drive frame 114' is rotated about the detection axis 127. Accordingly, during operation of the gyroscope sensor, the voltage across the first 404, 430 and the respective second 406, 431 correction electrode may be constant.

Furthermore, the drive frame 114' is physically connected to the first inertial mass 106 via the coupling member 125 and a spring 131 at an end portion 450 of the mass facing the drive frame 114'. Furthermore, the first coupling member 125 is physically connected to the displaceable drive frame at a far side 454 from the first inertial mass 106 with respect to the drive frame 114'. Moreover, the first elongated correction member 415 is arranged with the elongation direction 452 of the first elongated correction member 415 being substantially parallel with the detection axis 127. Note that, with "substantially parallel" means that a deviation of less than 2° between the elongation direction 452 and the detection axis 127 is acceptable. In addition, as illustrated in FIG. 4b, the first elongated correction member 415 is arranged at an end portion of the drive frame 114', opposite the side of the drive frame 114' closest to the detection axis 127.

With reference to FIG. 4b, the drive structure further comprises a drive sensing electrode 420 and the drive frame 114' comprises a respective drive sensing member 421 arranged adjacent to the drive sensing electrode 420. The drive sensing electrode 420 and the drive sensing member 421 are arranged such that a motion of the drive frame 114' results in a change in capacitance between the drive sensing electrode 420 and the drive sensing member 421. This way it is possibly to sense the motion of the drive frame 114'. The drive sensing electrode 420 and the drive sensing member 421 may be comb-formed electrodes comprising "fingers" or combs similar to the set of electrodes 417, 419 and the further electrode set 410-413.

As illustrated in FIG. 4*a-b*, the gyroscope sensor 102 may comprise a drive structures 402*a-d* having a corresponding drive frame 114',114", 116', 116". Thus, for each of the first and second inertial mass 104, 106 there is a respective first (402*a* and 402*c* respectively) and a second (402*b* and 402*d* respectively) drive structure. The drive frames 114', 114" may be interconnected to form the total drive frame 114, and drive frames 116', 116" may be interconnected to form the total drive frame 116. Although only 114' has been described in detail, the description is analogous for drive frames 114", 116', and 116".

The gyroscope sensor described herein may be a substantially planar sensor. Thus, the first 106 and second inertial mass 108, the coupling members 125, 126, the drive frames 114, 116, the spring type connections 131, 132, the connecting member 109, and springs 128, 129 may be formed in a single unit manufactured by e.g. epitaxial growth on a substrate 113 (e.g. a Si-substrate) and patterned and etched using lithography and etching methods of micro- and nano-fabrication techniques capable of manufacturing a structure (inertial masses and connection element) having even and well-defined thickness. Furthermore, the gyroscope sensor may be made from Silicon.

FIG. 6 illustrates a flow-chart of method steps according to an embodiment of the invention. In a first step, causing (S601) the drive frame to move in a lateral direction 302, thereby causing the first inertial mass 106 to oscillate in a rotational motion about an excitation axis 118 perpendicular to the detection axis 127 and to the sensitivity axis 104. In a subsequent step S603, detecting a change of the capacitance between the total inertial mass 105 and one of the first 110 and the second 112 electrode corresponding to a motion of the first inertial mass 106 about the detection axis 127. The change in capacitance is detected in-phase with the rotational motion about the excitation axis of the first inertial mass because the quadrature signal is in-phase with the excitation and 90 degrees out of phase with the desired signal (the corolis output signal) measured by the gyroscope sensor. Applying S605 a voltage across the first 404 and the second 406 correction electrode, thereby subjecting the first elongated correction member 415 to an electrostatic force, thereby rotating the drive frame 114' about the detection axis and thereby also rotating the first inertial mass 106 about the detection axis 127.

The method may further be applied to a second drive frame 114" interconnected to the first inertial mass 106 via the coupling member 125 and spring 131. The second drive frame is rotated in the same direction about the detection axis 127 as the first drive frame 114' thereby improving the efficiency of the rotation of the first inertial mass 106 about the detection axis 127 for quadrature compensation.

Furthermore, the method may be performed on a drive structure 402*c-d* of the second inertial mass 108 in a similar manner as for the first inertial mass 106 with drive structures 402*a-b*.

Additionally, variations to the disclosed embodiments can be understood and effected by the skilled person in practicing the claimed invention, from a study of the drawings, the disclosure, and the appended claims. For example, several gyroscope sensors 102 may be interconnected via a connection element 120*a-b*. This will now be described in more detail. In the following description, the gyroscope sensor described with reference to FIGS. 1-6 are denoted "gyroscope unit".

Figure 7:
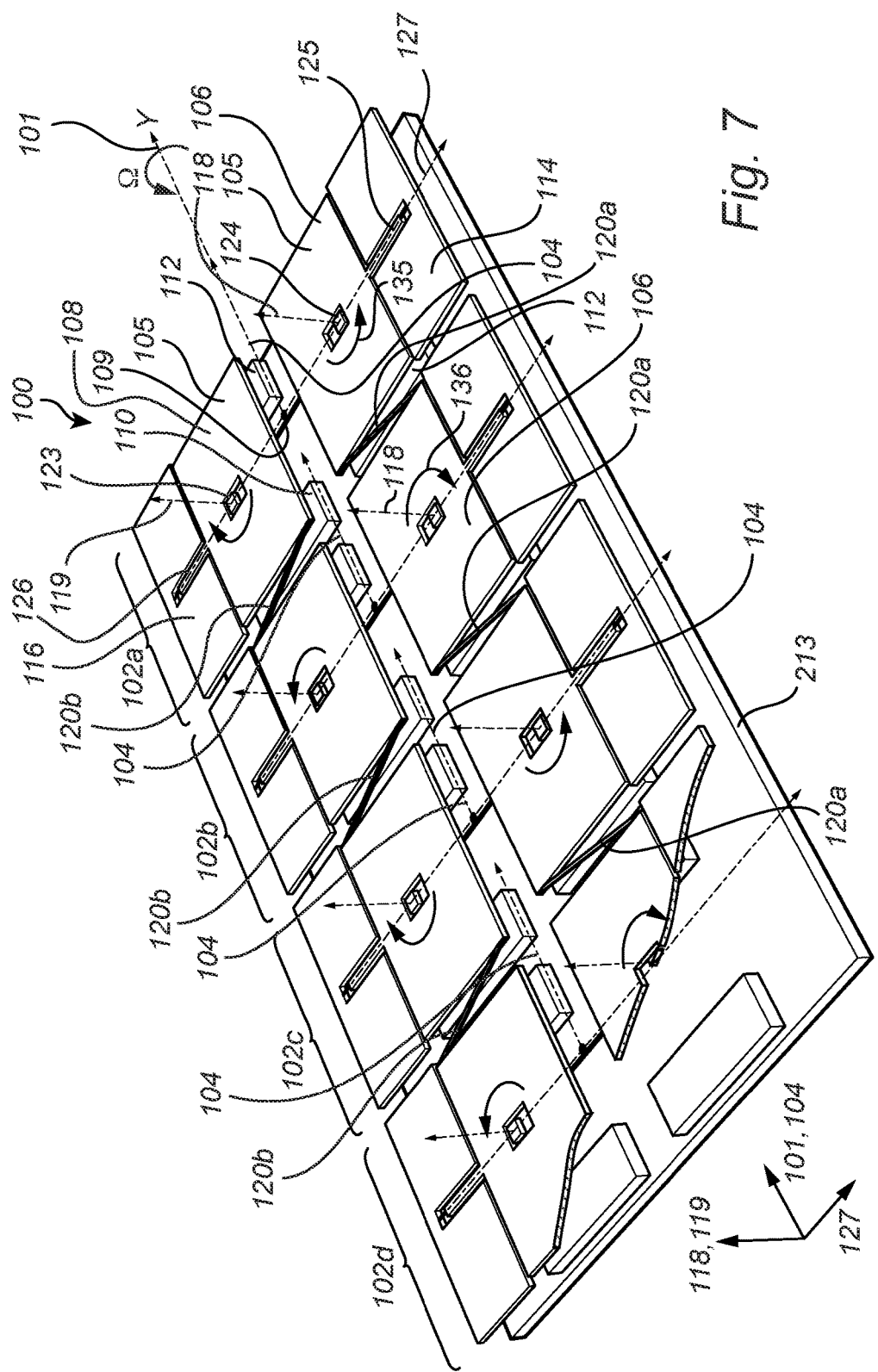
FIG. 7 illustrate interconnected gyroscope sensors.

FIG. 7 illustrates a perspective view of a sensor 100 according to an exemplary embodiment of the invention. The sensor 100 comprises four gyroscope units 102*a-d* (i.e. similar to the gyroscope sensor 102), each arranged as described with reference to FIG. 1*a-b*, arranged in a column where adjacent gyroscope units 102*a-d* are physically connected to each other by a respective connecting element 120*a*, 120*b*. As will be further described in with reference to subsequent drawings, the connecting element 120*a*, 120*b* forces inertial masses 106, 108 of the interconnected gyroscope units 120*a-b*, 120*b-c*, 120*c-d* to oscillate synchronously in anti-phase. In other words, the first inertial mass 106 of a gyroscope unit 102*a* is connected by a connecting element 120*a* to the first inertial mass 106 of a second gyroscope unit 102*b*. If the first inertial mass 106 of the first gyroscope unit 102*a* is rotated in a first direction 135 about its excitation axis 118, the rotation causes via the connection element 120*a* the first inertial mass 106 of the second gyroscope unit 102*b* to rotate about its respective excitation axis 118 in an opposite direction 136 compared to the first direction 135. And vice versa, when the first inertial mass 106 of 102*a* is rotated in the opposite direction 136 to the first direction 135, the first inertial mass 106 of gyroscope unit 102*b* is caused to rotate in the first direction 135.

The sensor 100 is adapted to measure a rotational motion about a resulting sensitivity axis 101 coincident with sensitivity axes 104 of the gyroscope units 102*a-d*. Furthermore, the first electrodes 110 of the each gyroscope unit 102*a-d* are electrically connected to each other and the second electrodes 112 of each gyroscope unit 102*a-d* are electrically connected to each other. These electrical connections may be done either on the substrate 213 or external to the substrate 213.

The sensor as shown in the embodiment of FIG. 7 is illustrated as a substantially planar sensor. Thus, the first 106 and second inertial mass 108, the connection element 120*a*, 120*b*, and the coupling members 125, 126 may be formed in a single unit manufactured by e.g. epitaxial growth on a substrate 213 (e.g. a Si-substrate) and patterned and etched using lithography and etching methods of micro- and nano-fabrication techniques capable of manufacturing a structure (inertial masses and connection element) having even and well-defined thickness.

Figure 8:
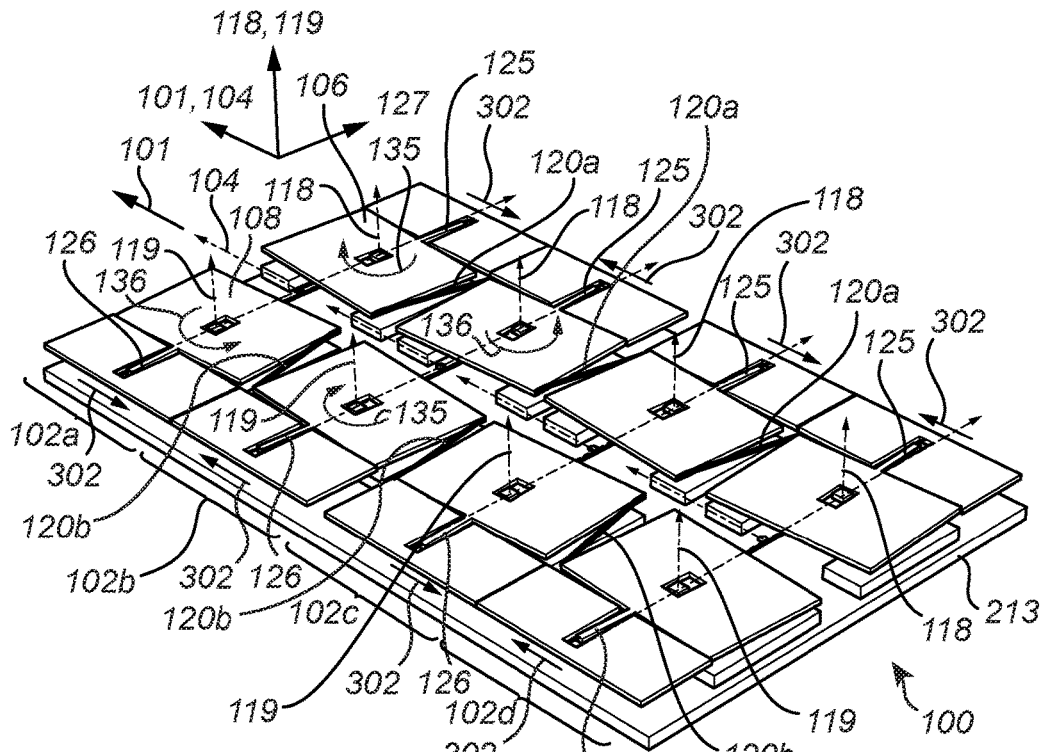
FIG. 8 shows interconnected gyroscope sensors in a drive mode.
Figure 9:
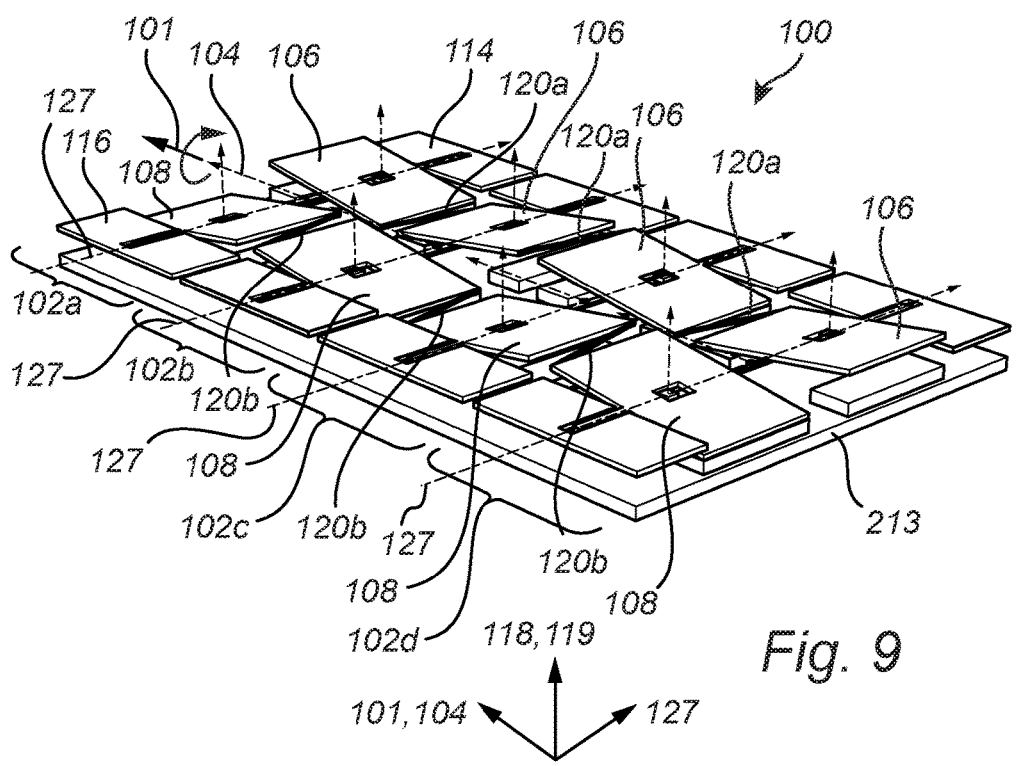
FIG. 9 shows interconnected gyroscope sensors in a sense mode.

FIG. 8 illustrates the motion of the inertial masses 106, 108 of the sensor 100 in the drive mode and FIG. 9 illustrates the sense mode of the sensor 100.

In the drive mode, shown in FIG. 8, the each of the excitation means 114, 116 of the gyroscope units 102*a-d* are exciting the respective inertial mass 106, 108 about the respective excitation axis 118, 119 by a motion of the excitation means 114, 116 in a lateral direction indicated by the arrows 302. Subsequently the excitation means 114, 116 moves in a direction opposite the arrows 302. Each inertial mass 106, 108 is physically connected to a respective excitation means 114, 116 with a coupling member 125, 126 such that the motion of the excitation means causes the respective inertial mass 106, 108 to oscillate in a rotational motion about the excitation axis 118, 119. During operation of the sensor 100, in the drive mode of the sensor, the excitation means 114, 116 thereby excites the respective inertial mass 106, 108 of the respective gyroscope unit 102*a-d* to oscillate in a rotational motion about the excitation axis 118, 119. The drive frame can be said to comprise the excitation means.

The excitation means 114, 116 are arranged to excite the inertial masses 106, 108 of each individual gyroscope unit 102*a-d* so that the inertial masses rotate synchronously in anti-phase with respect to each other about the respective excitation axis 118, 119 as illustrated in FIG. 8. The connecting element 120*a-c* which physically connects the first inertial mass 106 of a first gyroscope unit 102*a* with the first inertial mass 106 of an adjacent gyroscope unit 102*b*, and similarly a second connecting element 120*b* connects the second masses 108 of adjacent gyroscope units 102*a-b*, causes the first 106 and second mass 108 of the adjacent gyroscope units 102 to synchronously oscillate in anti-phase. For example, the connecting element may have an Z-shape as shown in e.g. FIG. 5*b*. With this shape, although other shapes are possible, the connecting element 120*a-c* may effectively use the motion of e.g. the first inertial mass 106 of a first gyroscope unit 120*a* to push or pull on the first inertial mass 106 of a second gyroscope 120*b* unit. Furthermore, in a similar way the second inertial mass 108 of a second gyroscope unit 102*b* may pull or push on the second inertial mass 108 of a first gyroscope unit 102*a*.

When the sensor is in the drive mode, thus when the inertial masses are being excited as described with reference to FIG. 8, and if the sensor 100 is then subjected to a rotation about the resulting sensitivity axis 101 (note that all the sensitivity axes 104 of the individual gyroscope units 102*a-d* coincide, thus forming a total sensitivity axis 101), then the coriolis force cause a rotational motion of the inertial masses 106, 108 about the detection axis 127 of the respective inertial mass 106, 108 in a way as shown in FIG. 9. Furthermore, as described with reference to FIG. 8, the excitation of the inertial masses 106, 108 about the respective excitation axis 118,119 is such that the inertial masses 106, 108 oscillate synchronously out of phase. In other words, when the inertial mass 106 rotate in a first (e.g. clockwise) direction 135, the second inertial mass 108 rotate in an opposite direction 136, here in the counter-clockwise direction. This out of phase oscillation leads to the similar anti-phase motion in the sense mode as described with reference to FIG. 9. Thus, as the inertial mass 106 rotate in a clockwise direction, the inertial mass 108 rotate in a counter-clockwise direction about the detection axis 127.

Furthermore, the connecting element 120*a* is adapted to physically connect the first inertial masses 106 of adjacent gyroscope units 102*a-b*, 102*b-c*, 102*c-d*, and in the same way a second connecting element 120*b* physically connects the second masses 108 of adjacent gyroscope units 102*a-b*, 102*b-c*, 102*c-d*. Since the first electrode 110 of each gyroscope unit 102*a-d* is electrically connected and also the second electrode of each gyroscope unit 102*a-d* is electrically connected, the electronic device 140 (as shown in FIG. 1) measures a resulting signal from all gyroscope units 102*a-d* operating synchronously. The synchronous operation is possible due to the physical connection obtained between gyroscope units 102*a-d* with the connecting elements 120*a-c*.

The connecting element 120 may be in the form of a self-supporting micro beam. The connecting element 120 may further be in the form of a spring. Furthermore, the connecting element may be in the form of a plate spring or a leaf spring. The connecting element 120 may be configured to be self-supporting and thereby being able to move freely apart from being connected to the inertial masses. The connecting element may further be flexible. Furthermore, the connecting element 120 may be sufficiently stiff in order to more efficiently force the inertial masses to oscillate synchronously in anti-phase.

In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The invention claimed is:

1. A gyroscope sensor for detecting a rotational motion about a sensitivity axis, said gyroscope sensor comprising:
    a total inertial mass comprising a first inertial mass and a second inertial mass physically attached to each other, each of said first and second inertial masses being arranged spaced apart from and facing a respective first electrode and a respective second electrode, wherein a rotation of said first inertial mass about a detection axis of said gyroscope sensor, said detection axis being perpendicular to said sensitivity axis and said rotation being caused by a coriolis force when said gyroscope sensor is subjected to a rotation about said sensitivity axis, results in a positive change of a capacitance between said total inertial mass and one of said first electrode and said second electrode and a negative change of a capacitance between said total inertial mass and the other one of said first electrode and said second electrode;
    a first drive structure comprising:
        a first correction electrode and a second correction electrode arranged side by side and separated by a gap, and arranged on the same side of said first inertial mass as the first electrode and facing in the same direction; and
        a first drive frame being displaceable relative to both said first and second correction electrodes and the first inertial mass and physically attached to the first inertial mass via a first coupling member, said drive frame comprising:
    a first elongated correction member, said first elongated correction member arranged spatially and electrically separated from the first correction electrode and the second correction electrode, arranged such that an overlap between the first elongated correction member with the gap and each of the first correction electrode and the second correction electrode is variable,
    wherein an electrostatic force between said first elongated correction member and the first correction electrode and the second correction electrode is modifiable as a result of a changed degree of overlap between the first correction member and the first correction electrode and the second correction electrode, whereby said changed degree of overlap causes said drive frame to rotate about said detection axis.

2. The gyroscope sensor according to claim 1, wherein said drive structure further comprises a further electrode set and said drive frame comprises a set of drive electrodes arranged adjacent to said further electrode set, wherein when a voltage is applied to the further electrode set said drive frame is set in motion, thereby moving said first elongated correction member with respect to said first correction electrode and said second correction electrode, and also the first inertial mass.

3. The gyroscope sensor according to claim 2, wherein each of said drive electrodes and each electrode of said further electrode set is comb-formed, wherein each drive electrode and the respective further electrode is inter-digitated.

4. The gyroscope sensor according to claim 1, wherein said first inertial mass is physically connected to said drive frame such that a motion of said drive frame causes said first inertial mass to rotate about an excitation axis perpendicular to said detection axis.

5. The gyroscope sensor according to claim 4, wherein said drive frame is physically connected to said first inertial mass via said first coupling member at an end portion of said first inertial mass, wherein said end portion faces said drive frame, and wherein said first coupling member is physically connected to said displaceable drive frame at a far side from the first inertial mass with respect to the drive frame.

6. The gyroscope sensor according to claim 1, wherein said first elongated correction member is arranged with an elongation direction of the first elongated correction member being substantially parallel with said detection axis.

7. The gyroscope sensor according to claim 1, wherein said first elongated correction member is arranged at an end portion of said drive frame, opposite the side of said drive frame closest to said detection axis.

8. The gyroscope sensor according to claim 1, wherein said drive structure further comprises a drive sensing electrode and said drive frame comprises a respective drive sensing member arranged adjacent to said drive sensing electrode, wherein a motion of said drive frame results in a change in capacitance between said drive sensing electrode and said drive sensing member, thereby sensing said motion of said drive frame.

9. The gyroscope sensor according to claim 1, wherein said drive frame comprises at least two elongated correction members and said drive structure comprises at least a respective second correction electrode pair.

10. The gyroscope sensor according to claim 1, wherein said drive frame is suspended by a plurality of springs.

11. The gyroscope sensor according to claim 1, wherein each of the first inertial mass and the second inertial mass of the gyroscope sensor is associated with a respective first drive structure and a second drive structure.

12. The gyroscope sensor according to claim 11, wherein each of the first and second drive structures is arranged external to a side of each respective inertial mass.

13. A method for quadrature compensation for a gyroscope sensor,
    said gyroscope sensor comprising:
    a total inertial mass comprising a first inertial mass and a second inertial mass physically attached to each other, each of said first and second inertial masses being arranged spaced apart from and facing a respective first electrode and a respective second electrode, wherein a rotation of said first inertial mass about a detection axis of said gyroscope sensor, said detection axis being perpendicular to a sensitivity axis and said rotation being caused by a coriolis force when said gyroscope sensor is subjected to a rotation about said sensitivity axis, results in a positive change of a capacitance between said total inertial mass and one of said first electrode and said second electrode and a negative change of a capacitance between said total inertial mass and the other one of said first electrode and said second electrode;

a first drive structure comprising:
  a first correction electrode and a second correction electrode arranged side by side and separated by a gap, and arranged on the same side of said first inertial mass as the first electrode and facing in the same direction; and
  a first displaceable drive frame being displaceable relative to both said first and second correction electrodes and the first inertial mass and physically attached to the first inertial mass via a first coupling member, said drive frame comprising:
a first elongated correction member, said first elongated correction member arranged spatially and electrically separated from the first correction electrode and the second correction electrode, arranged such that an overlap between the first elongated correction member with the gap and each of the first correction electrode and the second correction electrode is variable,
wherein said method comprises the steps of:
causing said drive frame to move in a lateral direction, thereby causing said first inertial mass to oscillate in a rotational motion about an excitation axis perpendicular to said detection axis and to said sensitivity axis;
detecting a quadrature offset by detecting a variation of the capacitance between said total inertial mass and one of said first electrode and said second electrode corresponding to a motion of said first inertial mass about said detection axis, said variation in capacitance being in phase with said rotational motion of first inertial mass about said excitation axis; and
applying a voltage across said first correction electrode and said second correction electrode based on said detected quadrature offset, thereby subjecting said first elongated correction member to an electrostatic force, thereby rotating said drive frame about said detection axis and thereby also rotating said first inertial mass about said detection axis.

14. The method according to claim 13, wherein each of the first inertial mass and the second inertial mass of the gyroscope sensor is associated with a respective first drive structure and a respective second drive structure, wherein the method steps are performed on each of the first and second drive structures.

15. The method according to claim 14, further comprising applying a first voltage across said first and second correction electrodes of said first or second drive structure associated with said first inertial mass thereby rotating said first or second drive frame of said first inertial mass about said detection axis and thereby also rotating said first inertial mass in a first rotational direction about said detection axis,
  applying a second voltage across said first and second correction electrodes of said first or second drive structure associated with said second inertial mass thereby rotating said first or second drive frame of said second inertial mass about said detection axis and thereby also rotating said second inertial mass in a second rotational direction about said detection axis,
wherein said first rotational direction is opposite to said second rotational direction.

* * * * *